United States Patent Office 2,961,420
Patented Nov. 22, 1960

2,961,420

NOVEL STYRENE LATICES

Robert J. Frey, Jr., South Hadley, and Murray H. Roth, Springfield, Mass., assignors to Monsanto Chemical Company, St. Louis, Mo., a corporation of Delaware No Drawing. Filed Dec. 9, 1957, Ser. No. 701,335

6 Claims. (Cl. 260—27)

This invention relates to the polymerization of styrene compounds in aqueous emulsion. More particularly, it relates to novel polystyrene latices for use in improved floor wax formulations.

The growing use of self-polishing, or "dry-bright," floor waxes has stimulated the development of improved floor wax formulations containing polystyrene latices. However, the presently available styrene latices suffer from two major disadvantages. First, they lack the extremely fine particle size necessary for really superior finishes and secondly, they do not form films when used in co-mixture with waxes.

Now, it is an object of this invention to provide polystyrene latices comprised essentially of very fine-grained particles of polystyrene in aqueous emulsion.

Another object is the provision of styrene latices which form films when used in co-mixture with waxes.

Another object is the provision of "dry-bright" floor wax formulations of superior gloss, solvent resistance and mechanical stability.

These and other objects are attained by the aqueous emulsion polymerization of a styrene compound at a pH of from 8.0 to 9.2 in the presence of a non-ionic surfactant and shellac. The products are aqueous latices containing from 30 to 60% by weight of fine-grained particles of polystyrene, at least a minor proportion thereof being a solvent resistant styrene-shellac interpolymer.

The following examples are given in illustration of the invention and are not intended as limitations thereon. Where parts are mentioned they are parts by weight.

Example I

Dissolve 5 parts of polyoxyethylene oleyl alcohol and 2 parts of 37% aqueous ammonium hydroxide in 225 parts of water. The solution temperature is brought to about 60° C. and 20 parts of bleached and dewaxed shellac are dissolved therein. The solution temperature is raised to about 90° C. and the pH is adjusted to 9.2 with ammonium hydroxide, if necessary. Then 100 parts of styrene monomer containing 0.4% by weight of cumene hydroperoxide are slowly added over a period of about 90 minutes, maintaining constant agitation and permitting the batch to attain reflux temperature. After all of the styrene monomer has been charged, the batch temperature is cooled to about 95° C. and is so maintained for about an additional 30 minutes. The batch is finally cooled to 40° C.

Analysis of the latex shows it to contain 36% solids by weight. These solids contain practically no sludge, i.e., less than 2% by weight thereof, but consist essentially of very fine-grained particles having the analysis shown in Table A; as found by solvent extraction.

Example II

Example I is repeated at a pH of 8.6. The resultant latex again contains 36% solids by weight. These solids contain even less sludge, i.e., less than 1% by weight, but the particles, while still very fine-grained, are not as fine as those obtained in Example I. The solids have the analysis shown in Table A; as found by solvent extraction.

TABLE A

| | Example I pH 9.2 | Example II pH 8.6 |
|---|---|---|
| | Percent | Percent |
| Methanol Solubles | 17.2 | 17.2 |
| Benzene Solubles | 33.1 | 46.4 |
| Insoluble in Both | 49.7 | 36.4 |

Further analysis shows the methanol soluble solids to be principally shellac and surfactant, the benzene soluble solids to be essentially linear styrene polymers and finally, the residual particles which are insoluble in both methanol and benzene to be principally a solvent-resistant styrene-shellac interpolymer.

The styrene monomers of this invention are styrene, divinyl benzene, alpha-methyl styrene and the corresponding halo, nitro, methyl and ethyl nuclear substituted derivatives thereof. Examples of the latter include p-chlorostyrene, p-nitrostyrene, 2-methyl-1,4-divinyl benzene, o-vinyl toluene, 2,4-dimethylstyrene, 2-ethyl-alphamethylstyrene. The styrene monomers may be used alone, in co-mixture with each other, or in co-mixture with minor proportions of other vinyl monomers copolymerizable therewith, e.g., ethylenically unsaturated nitriles such as acrylonitrile, esters of acrylic and methacrylic acids such as ethyl acrylate, methyl methacrylate, etc., etc. In a preferred embodiment, the monomeric charge is styrene. Monomer concentrations of from 20 to 50% by weight, based upon the weight of the latex are used; from 30 to 45% by weight being especially preferred.

Shellac is the emulsifying agent of this invention. It is a unique emulsifying agent in that a small proportion, that is, about 10 to 30% by weight, of the shellac forms a solvent-resistant interpolymer with the styrene polymerization product. The best results are obtained using refined, i.e., bleached and dewaxed, shellac. However, in non-critical applications, any commercial shellac may be used, e.g., orange shellac, etc. Actually the only objection to the latter shellacs is that the presence of wax and/or color bodies leads to cloudiness and/or yellowness, respectively, in the polymer particles, which in turn affects the quality of floor finishes prepared therefrom. Shellac concentrations of from 1 to 10% by weight, based on the weight of the latex, are used. Concentrations of from 3 to 7% by weight being especially preferred. If desired, other alkali soluble natural polymers such as gum kauri, etc. may be substituted for the shellac in whole or in part.

The shellac solubilizing agent used is ammonium hydroxide. Other alkalies will effectively solubilize the shellac but unfortunately they lead to the formation of complex salts which are difficult to remove from the latex. The reaction pH is also controlled by this ammonium hydroxide, as is discussed later. Care must be exercised never to allow the reaction mixture to become more alkaline than the desired operating pH since partial neutralization would then be necessary, leading to the formation of undesirable salts.

Various non-ionic surfactants may be employed. While such may function as co-emulsifying agents, it is believed that they function essentially as stabilizing agents for the shellac based emulsions. The preferred non-ionic surfactants are the polyoxyethylene fatty alcohols, polyoxyethylene sorbitan fatty acids and the fatty acid alkanolamides. For example, polyoxyethylene oleyl alcohol, polyoxy ethylene sorbitan monolaurate and lauric diethanolamide. Surfactant concentrations of from 0.2 to 7% by weight, based upon the weight of the latex, are used. Concentrations of from 0.8 to 3% by weight being especially preferred.

Those ancillary additives which are conventionally used in emulsion polymerization processes may also be employed here. Obviously, a polymerization catalyst is required and any conventional catalyst may be so used. For example, the "peroxy" catalysts such as potassium persulfate and cumene hydroperoxide, which are especially preferred. The optimum catalyst concentration is of course dependent upon the catalyst used, the monomeric system to be polymerized and the process conditions. However, as a general rule, catalyst concentrations of from 0.1 to 1.0% by weight of monomer are most effective.

The process is carried out at a pH in the range of from 8.0 to 9.2. It has been found that the exact pH used has a profound effect upon the latices prepared. In general, the quantity of styrene-shellac interpolymer formed increases with increasing reaction pH. Therefore, to more fully attain the advantages provided by this interpolymer structure, e.g., high gloss, great elasticity, high mechanical stability, etc., it is preferred to conduct the polymerization at a pH of from 8.6 to 9.2.

Commercial latices are conventionally prepared containing from 30 to 60% solids by weight as a practical limitation. In the polymerization process, the relative proportions of the water and the monomer charged are carefully adjusted so that the desired latex solids concentration is obtained directly, without requiring removal of any portion of the water. Water added as dilute solutions of ammonium hydroxide must be taken into consideration as part of the total water charged. There are excellent economic reasons for these limitations since it is costly to transport and/or store unnecessary water and further, it is costly to remove water from the finished latex.

At least a portion of the required quantity of shellac must be dissolved in the aqueous phase prior to monomer addition. This must be accomplished by adding sufficient ammonium hydroxide to the aqueous phase to solubilize the shellac, heating the solution to from 40° to 70° C. and then adding the desired quantity of shellac. If desired, sufficient ammonium hydroxide may be added at this point to attain the necessary process pH. All of the shellac may be so pre-dissolved but satisfactory results are obtained by withholding up to 50% of the shellac to be added at some point prior to the completion of the monomer addition. Similarly, the non-ionic surfactant may be added either prior to the shellac, after the shellac but prior to the monomer, or with the monomer. The surfactant may similarly be added in several stages. The polymerization catalyst is most advantageously added dissolved in the monomer, but if desired it may be pre-dissolved in the aqueous phase.

Prior to adding the monomer, the aqueous phase must be heated to 70° to 100° C. and adjusted to the desired operating pH, if necessary, by adding further ammonium hydroxide. The monomer, or combination of monomers, is slowly added to the aqueous phase, with constant agitation. The heat of polymerization is permitted to raise the batch to reflux temperature, which temperature is maintained until polymerization is completed. If desired, cooling may be used to maintain the batch at a temperature below reflux, but not below 90° C.

The polystyrene latices prepared according to the teachings of this invention contain about 30 to 60% solids by weight. These solids are resinous particles of essentially very fine and uniform grain size. Analysis by solvent extractions reveals that these solids are essentially a ternary combination, as follows:

|  | Percent |
| --- | --- |
| Methanol solubles | 10 to 25 |
| Benzene solubles | 25 to 55 |
| Insoluble in either | 30 to 60 |

Percentages shown are percent by weight based upon the total weight of solids. Further analysis reveals the methanol solubles to be comprised essentially of the non-ionic surfactant and the residual shellac which has not been interpolymerized with the styrene polymer. The benzene solubles are similarly found to be principally a linear styrene polymer. The solvent-resistant fraction is an interpolymer of shellac with the styrene polymer. The exact proportions of each of the fractions within this ternary combination is, of course, dependent upon the initial proportions of the initial ingredients and the reaction pH used. As has already been mentioned the term styrene polymer refers to a broad number of styrene homopolymers and copolymers.

These latices are compatible with waxes, forming high gloss films on floors coated with formulations thereof. Such floor finishes also possess excellent solvent resistance and mechanical stability. It has been found that floor wax formulations containing styrene latices prepared under the more alkaline conditions provide floor finishes of higher gloss and greater elasticity.

The floor wax formulations are prepared according to conventional techniques, an example of which follows.

*Example III*

The latex prepared in Example I is mixed with a plasticizer and diluted with water in the following proportions.

| | | |
| --- | --- | --- |
| Latex of Example I | parts | 240 |
| Tricresyl Phosphate | do | 15 |
| Water | ml | 450 |

About 60 parts of the above mixture are then added to and blended with about 40 parts of a 12% aqueous carnauba wax emulsion. When coated on linoleum floors this floor wax formulation "dries bright" to leave a high gloss film which is resistant to solvents. In making floor waxes, these styrene latices are modified with plasticizer and blended with emulsified waxes and other conventional additives. Conventional plasticizers may be used but phosphate esters, phthalate esters, or combinations thereof are preferred. Similarly, the conventional natural and synthetic polishing waxes may be used but carnauba wax is preferred. In general, from 20 to 80% by weight of latex solids, based upon the total weight of solids, i.e., latex plus wax, are employed. Those formulations containing from 50 to 80% by weight of latex solids being especially preferred as providing maximum "dry bright" properties. These floor wax formulations are used on linoleum, rubber tile, synthetic resin tile, etc. floors.

It is obvious that many variations may be made in the products and processes of this invention without departing from the spirit and scope thereof.

What is claimed is:

1. In a process for the aqueous emulsion-polymerization of monomeric polymerizable materials comprising at least 50% by weight of a styrene compound selected from the group consisting of styrene, alpha-methyl styrene, divinyl benzene and the corresponding halo, nitro, methyl and ethyl nuclear substituted derivatives thereof, the step of effecting said polymerization at a pH of from 8.0 to 9.2 in the presence of from 0.2 to 7% of a non-ionic surfactant and from 1 to 10% of shellac, both expressed as percent by weight of the latex.

2. A process as in claim 1 wherein the styrene compound is styrene.

3. A process as in claim 1 wherein the shellac is a refined, bleached and dewaxed shellac present in the quantity of from 3 to 7% by weight of the latex.

4. A process as in claim 1 wherein the polymerization is effected at a pH of from 8.6 to 9.2.

5. A process as in claim 1 wherein the styrene compound is styrene, the shellac is a refined, bleached and dewaxed shellac present in the quantity of from 3 to 7% by weight of the latex, and the polymerization is effected at a pH of from 8.6 to 9.2.

6. A process as in claim 1 wherein the monomeric polymerizable material is comprised essentially of from 50 to 95% by weight of styrene and from 50–5% by weight of a monomer co-polymerizable therewith.

References Cited in the file of this patent
UNITED STATES PATENTS

| | | |
|---|---|---|
| 2,155,591 | Garvey | Apr. 25, 1939 |
| 2,733,224 | Smith et al. | Jan. 31, 1956 |

OTHER REFERENCES

Perry et al.: Soap & Chem. Spec., vol. 30, p. 145–7, 167, September 1954.